Figure 1:
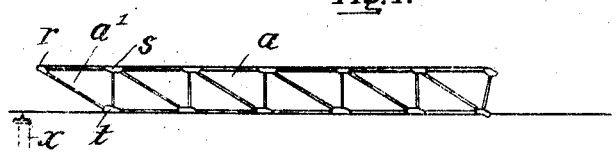
Figure 2:
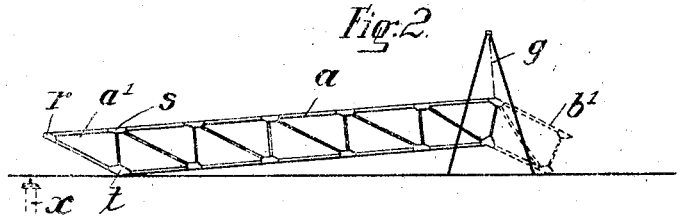
Figure 3:
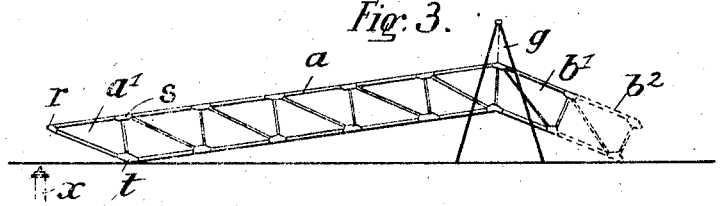
Figure 4:
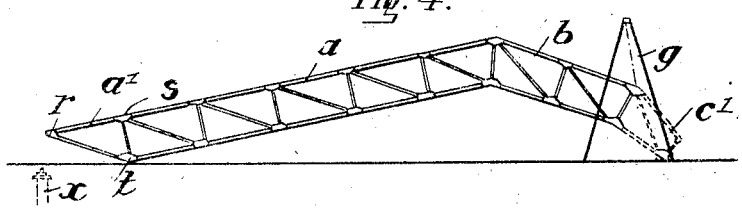
Figure 5:
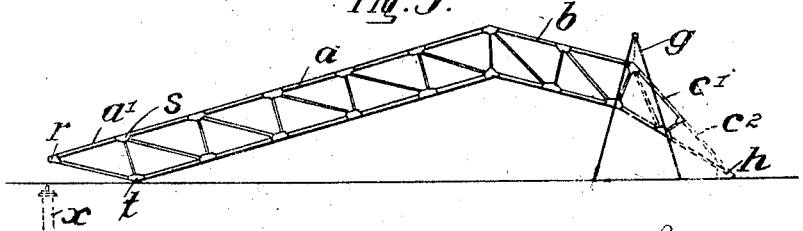

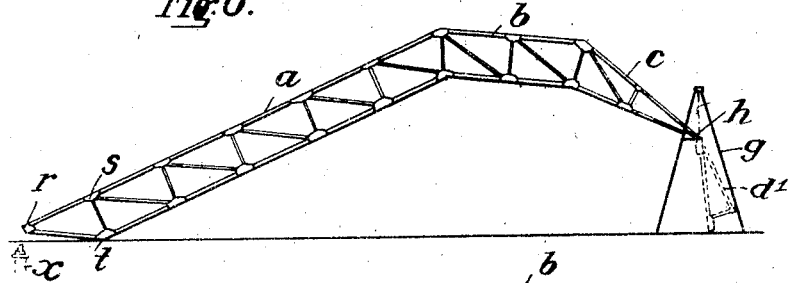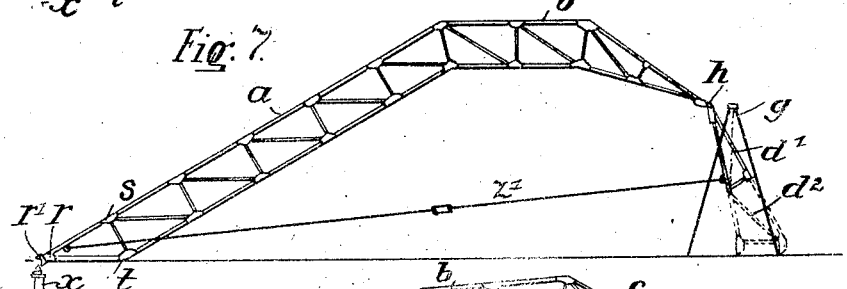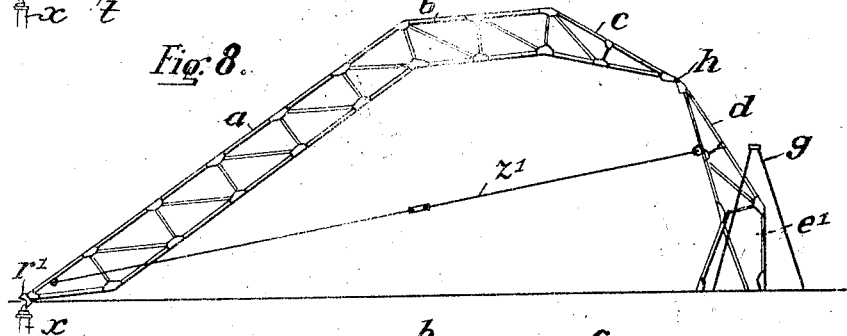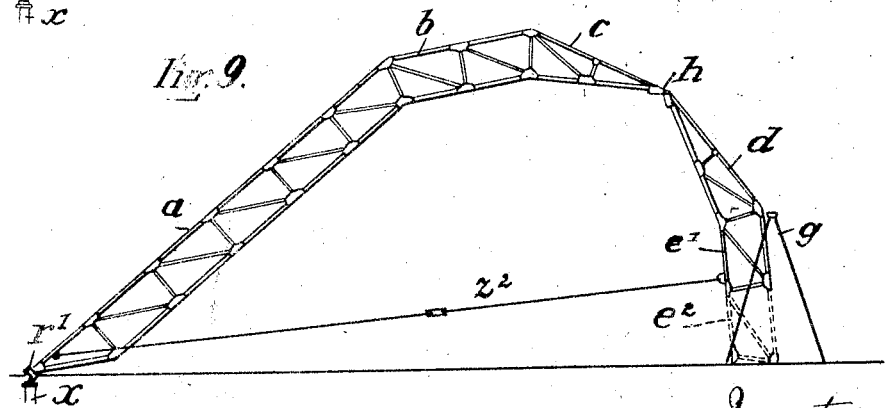

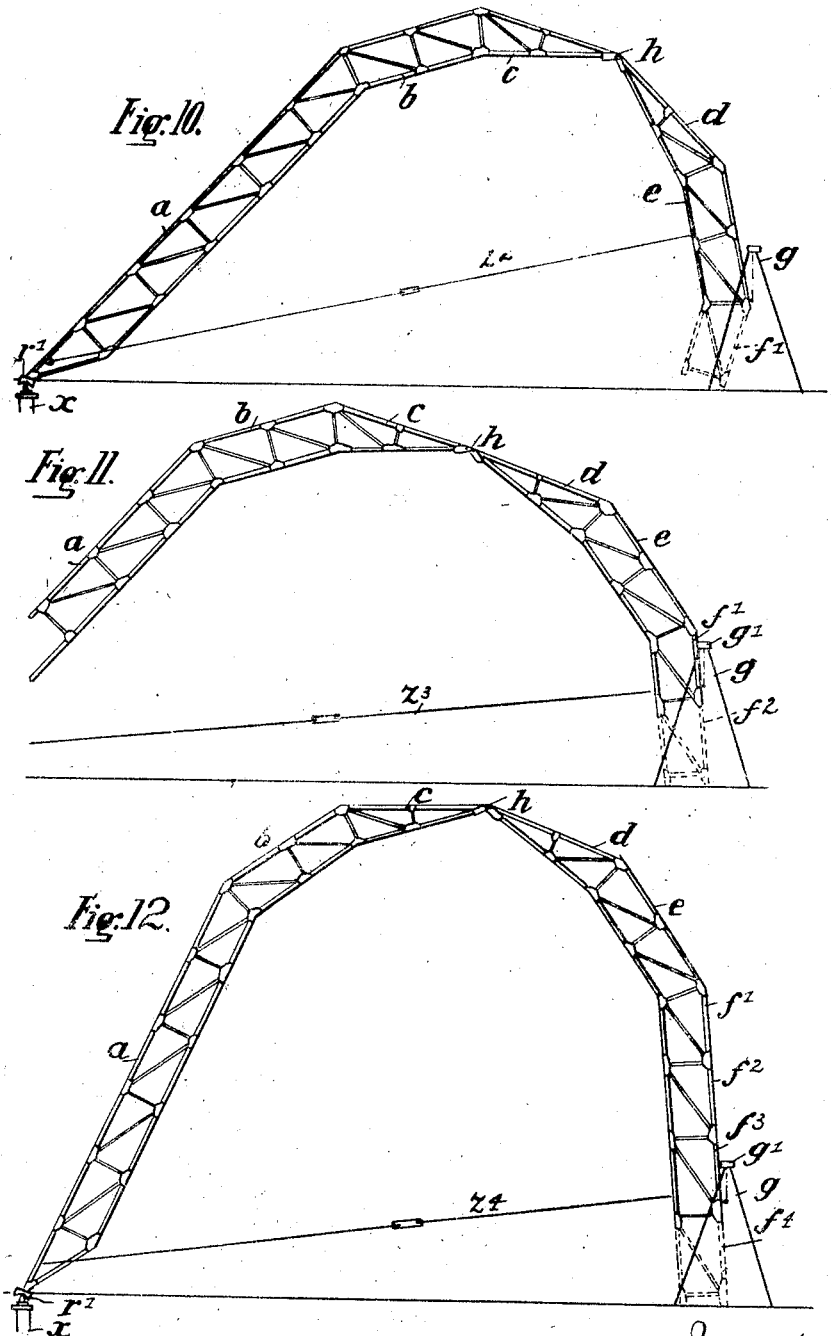

H. HOLLAND.
CONSTRUCTION OF HALLS, AIRSHIP HANGARS, AND OTHER STRUCTURES.
APPLICATION FILED JAN. 6, 1913.

1,058,432.

Patented Apr. 8, 1913.

UNITED STATES PATENT OFFICE.

HEINRICH HOLLAND, OF CHARLOTTENBURG, GERMANY, ASSIGNOR TO CARL FRANK, OF CHARLOTTENBURG, GERMANY.

CONSTRUCTION OF HALLS, AIRSHIP-HANGARS, AND OTHER STRUCTURES.

1,058,432.

Specification of Letters Patent.

Patented Apr. 8, 1913.

Application filed January 6, 1913. Serial No. 740,472.

*To all whom it may concern:*

Be it known that I, HEINRICH HOLLAND, a citizen of the German Empire, residing at Charlottenburg, in the Kingdom of Prussia, German Empire, have invented new and useful Improvements in or Relating to the Construction of Halls, Airship-Hangars, and other Structures, of which the following is a specification.

My invention relates to improvements in the method or process for constructing or dismounting large halls or buildings (as for instance for housing air ships), which has been described in the patent of the United States No. 1,032,284 previously granted to me July 9, 1912, and which consists in constructing a hall section of any length and comprising a number of trusses step by step, without scaffolding, by tilting up partially finished trusses about the foot points of the one longitudinal side of the hall, and building on or attaching the next following truss sections under the other or elevated side. When the trusses are constructed as three-jointed arches, then during the construction the lowest points for the time being of the two truss sides of the partly finished trusses are connected with each other by tension rods or members. These latter must therefore be shifted or changed and varied in length as required during the process of construction.

The improvement of the process consists in that the partially finished hall section is tilted up about the foot points of the trusses during the construction, *i. e.* that the tilting always takes place about the foot points of the trusses at one side of the hall only, namely about the foot points of the lowermost truss sections. In the first place the lowermost truss sections of the one longitudinal side of the hall section are constructed on the ground; then the upper girders, lower girders and diagonal ties or braces for the next following truss sections are jointed on while the structure is on the ground. The structure is then tilted up about the foot points of the lowermost truss sections to a sufficient extent to allow the bars or elements of the next truss section to be connected together; then upper girders, lower girders, and diagonal braces of the next following truss sections are jointed on and the structure is again tilted about the foot points of the lowermost truss sections to a sufficient extent to enable the bars that have been jointed on to be connected together to form the next truss section, and so on until one half of the truss has been completed. Then in the same way the uppermost truss section of the other half truss is built on and its lowermost point is temporarily connected by a tension band or member with the foot of the finished half truss, and then the succeeding truss sections, or their sub-sections of the other half truss are built on, the tension band being always as far as possible connected to the lowest point.

The advantages of the new method or process are that no scaffolding is required in erecting the hall or structure it being only necessary to employ hoisting devices at one side, which only need to be shifted relatively short distances during the progress of construction. Moreover the one half of the truss can be entirely constructed without putting in tension rods or members, as it represents a rigid beam. A further advantage is that, at least during the second portion of the operation of erecting or setting up the hall, the tilting can always take place on the ultimate bearers or supports of the finished hall. Thus the final work of leveling or adjusting the hall is extremely simplified.

The accompanying drawings represent by way of example the construction of such a hall in its various stages of progress.

Figure 13:
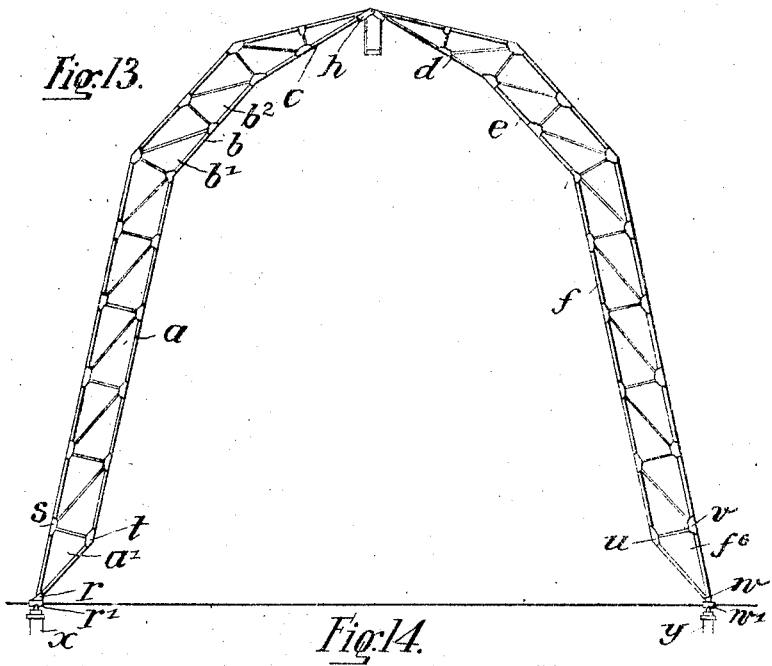
Figure 14:
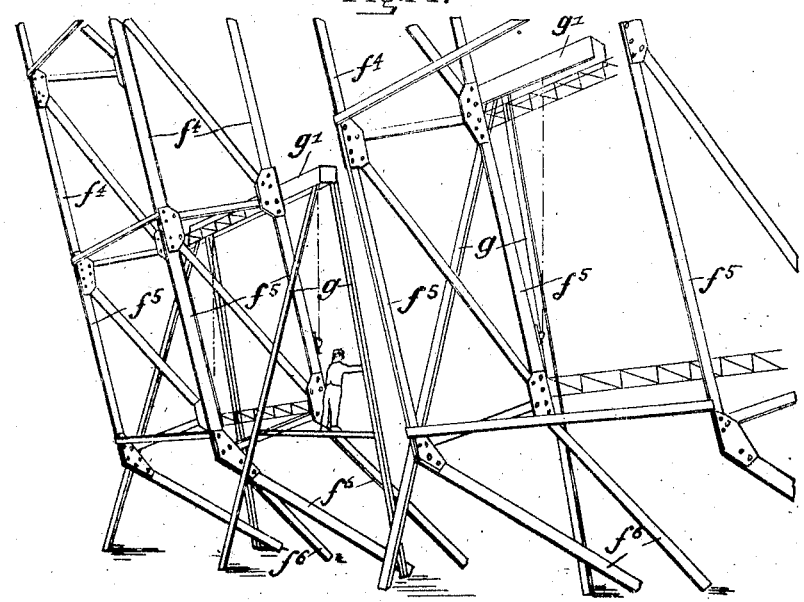

Figures 1 to 13 are views illustrating in face view a truss in the successive stages of construction, from the commencement of the work, Fig. 1, to the completion of the truss, Fig. 13. Fig. 14 is a perspective view of the extreme end of a hall section in course of construction, namely during the building on of the last truss section, and consequently when the erection of the hall is nearly complete. It will be seen from this figure that two trusses are always united into one rigid pair of trusses by transverse and diagonal ties or members and are tilted or elevated together by one hoisting frame or device. The different pairs of trusses are only connected together by cross beams.

In the example illustrated the complete truss (see Fig. 13) consists of the truss sections *a*, *b*, *c*, *d*, *e*, and *f*. Each of these sections in turn consists of several portions or sub-sections of approximately equal length. In the following description I shall speak only of one truss and its sections or sub-sections, but it will be remembered that two trusses are always united into a pair during construction and are elevated or tilted together by a common hoisting frame, and that all the truss pairs appertaining to the hall section to be erected, or it may even be to the entire hall, are simultaneously and uniformly tilted and finished. (See Fig. 14).

In the example illustrated each sub-section or division of the truss sections is formed of an outer girder, an inner girder, two transverse bars and a diagonal brace, each transverse bar at the same time appertaining to two consecutive sub-sections or sections of the truss. The lowermost truss section $a$ of the left half truss and the lower truss section $f$ of the right half truss each consist of six sub-sections. The lowest of these $a^1$ and $f^6$ form triangles $r, s, t$ and $u, v, w$. At the bottom points $r$ and $w$ are fixed the bearer plates $r^1$, $w^1$, which in the finishing of the hall rest upon the bearers $x$ and $y$ anchored in the ground. First the truss section $a$ is constructed on the ground (see Fig. 1), then the upper girder, lower girder and diagonal brace for the adjoining sub-section $b^1$ of the next truss section $b$ are jointed to the right of section $a$. Then by means of the hoisting frame $g$ the truss section $a$ is tilted up about $t$ as a fulcrum to a sufficient extent to enable the sub-section $b^1$ to be completed after the second transverse bar has been fitted in (see Fig. 2). Then the upper girder, lower girder and the diagonal brace of the next sub-section $b^2$ are jointed to the structure, and the beam formed by the truss section $a$ and sub-section $b^1$ are tilted higher about the point $t$ sufficiently to allow the sub-section $b^2$ to be finished (see Fig. 3). In this position the upper and lower girders and the diagonal brace of the next sub-section $c^1$ are jointed on. The hoisting frame $g$ is now moved toward the right, and the structure thus far completed is again tilted up about $t$ high enough to enable sub-section $c^1$ to be completed (see Fig. 4). With the hoisting frame $g$ in the same position, the structure is now further raised to a sufficient extent to allow of connecting together the upper girder and lower girder of the next sub-section $c^2$, which meet at the crown $h$ of the truss (see Fig. 5). The hoisting frame $g$ is then again moved a suitable distance to the right, and the left half truss $a$, $b$, $c$ is raised high enough to enable the next sub-section $d^1$ to be put together, (see Fig. 6), and a tension rod $z^1$ connected (see Fig. 7). The succeeding sections $d^2$, etc., are built on similarly. In the further progress of the construction the tension rod must be changed from time to time and connected to lower points of the right half truss. Thus as the construction proceeds the rod $z^1$ (Figs. 7 and 8) must be changed for the tension rod $z^2$ (Figs. 9 and 10) and this for the tension rod $z^3$ (Fig. 11) and this again for the tension rod $z^4$ (Fig. 12). In the position shown in Fig. 7 the bearer plate $r^1$ already rests on the bearer $x$, and in the further tilting, the truss always turns on the axis of the bearer $x$. In the position shown in Fig. 8, where the sub-section $e^1$ is being built on, this sub-section is shown shortly before it has been completed or connected together, the upper and lower girders and diagonal brace that have been jointed on the end of the preceding sub-section being seen not yet connected together. In the positions shown respectively in Figs. 9, 10, 11, and 12, the truss sections $e^2$, $f^1$, $f^2$ and $f^4$ are respectively built on to the structure. To permit of elevating the structure from the position of Fig. 10 to that of Fig. 11, the tension rod $z^3$ must be considerably lengthened, i. e., the angle formed at the crown $h$ by the jointed half-trusses must be increased as otherwise when the structure is being elevated, the outer girder of sub-section $f^1$ would foul the top beam or head $g^1$ of the hoisting frame which serves for hoisting a pair of trusses. By suitably regulating the length of the tension rod the trusses can be prevented from fouling the top bar $g^1$ of the hoisting frame in the subsequent stages of lifting, and the final position of the two half trusses in relation to each other can be attained either gradually or at the end of the construction by suitably shortening the tension rod, so that the bearer plate $w^1$ lies on the bearer $y$.

I claim herein as my invention:

1. Process for constructing halls, air-ship hangars and other buildings, said process comprising as steps first constructing on the ground at one side of the building to be erected, the lower truss sections of a building section comprising a plurality of truss sections, then for each truss of the building section, jointing to the compound truss member the adjoining bars for the next truss section or division, tilting the so far completed building section up about one end, and completing the next truss divisions of the building section with the aid of the bars jointed on, substantially as described.

2. Process for constructing halls, air-ship hangars and other buildings, said process comprising as steps first constructing on the ground at one side of the building to be erected, the lower truss sections of a building section comprising a plurality of truss sections, then for each truss of the building section, jointing to the compound truss member the adjoining bars for the next truss section or division, tilting the so far completed building section up about one end, completing the next truss divisions of the building section with the aid of the bars jointed on, and so on until half the building section is complete, then successively constructing on to the tilted building section the truss sections or divisions of the other half of the building section, the building section being progressively further tilted in the progress of the construction, substantially as described.

3. Process for constructing halls, air-ship hangars and other buildings, said process comprising as steps first constructing on the ground at one side of the building to be erected, the lower truss sections of a building section comprising a plurality of truss sections, then for each truss of the building section, jointing to the compound truss member the adjoining bars for the next truss section or division, tilting the so far completed building section up about one end, completing the next truss divisions of the building section with the aid of the bars jointed on, and so on until half the building section is complete, then successively constructing on to the tilted building section the truss sections or divisions of the other half of the building section, the building section being progressively further tilted in the progress of the construction, and tension devices being connected between the completed half building section and the half section in course of construction, substantially as described.

In witness whereof I have hereunto set my hand in presence of two witnesses.

HEINRICH HOLLAND.

Witnesses:
HENRY HASPER,
WOLDEMAR HAUPT